(12) United States Patent
Bart et al.

(10) Patent No.: US 11,307,758 B2
(45) Date of Patent: *Apr. 19, 2022

(54) SINGLE CONTACT SCALING GESTURE (71) Applicant: Apple Inc., Cupertino, CA (US)

(72) Inventors: Assaf Bart, Patch-Tikva (IL); Igor Rayboy, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,094

(22) Filed: Mar. 4, 2019

(65) Prior Publication Data
US 2019/0354280 A1    Nov. 21, 2019

Related U.S. Application Data

(63) Continuation of application No. 13/595,943, filed on Aug. 27, 2012, now Pat. No. 10,222,975.

(51) Int. Cl.
*G06F 3/0488* (2013.01)
*G06F 3/041* (2006.01)
(Continued)

(52) U.S. Cl.
CPC ........ *G06F 3/04883* (2013.01); *G06F 3/0412* (2013.01); *G06F 3/0486* (2013.01);
(Continued)

(58) Field of Classification Search
CPC ...... G06F 3/0484–0486; G06F 3/0488–04886; G06F 3/041–0418;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 2309370 A2 | 4/2011 |
| EP | 2482179 A2 | 8/2012 |

(Continued)

OTHER PUBLICATIONS

Final Office Action received for U.S. Appl. No. 13/595,943 dated May 18, 2015, 16 pages.

(Continued)

*Primary Examiner* — David Tung
(74) *Attorney, Agent, or Firm* — Kubota & Basol LLP (57) ABSTRACT

Methods and systems for providing input to a computing device based on a single contact scaling gesture are provided. A scaling gesture can be performed on a touch-sensitive panel to zoom in or out of a displayed image, for example. One example of a scaling gesture can include two touch contacts moving towards or away from each other. A single contact scaling gesture can include selecting a scaling command based on a first touch input being held for a predetermined duration of time, or based on other criteria. Once the scaling command has been selected, subsequent touch input can determine both a scaling factor and a scaling direction of the scaling command.

30 Claims, 8 Drawing Sheets

(51) Int. Cl.
*G06F 3/0484* (2013.01)
*G06F 3/0486* (2013.01)
*G06F 3/04883* (2022.01)
*G06F 3/04842* (2022.01)
*G06F 3/04845* (2022.01)

(52) U.S. Cl.
CPC ...... *G06F 3/04842* (2013.01); *G06F 3/04845* (2013.01); *G06F 2203/04104* (2013.01); *G06F 2203/04806* (2013.01); *G06F 2203/04808* (2013.01)

(58) Field of Classification Search
CPC . G06F 2203/04104; G06F 2203/04806; G06F 2203/04808
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2002/0056575 A1* | 5/2002 | Keely | G06F 1/1626 178/18.01 |
| 2005/0190059 A1 | 9/2005 | Wehrenberg | |
| 2006/0017692 A1 | 1/2006 | Wehrenberg et al. | |
| 2006/0026521 A1 | 2/2006 | Hotelling et al. | |
| 2006/0033724 A1 | 2/2006 | Chaudhri et al. | |
| 2006/0197753 A1 | 9/2006 | Hotelling | |
| 2006/0227116 A1* | 10/2006 | Zotov | G06F 3/0418 345/173 |
| 2007/0177804 A1 | 8/2007 | Elias et al. | |
| 2008/0129759 A1* | 6/2008 | Jeon | G06F 3/04845 345/667 |
| 2010/0053111 A1* | 3/2010 | Karlsson | G06F 3/04883 345/174 |
| 2010/0060588 A1* | 3/2010 | Fong | G06F 3/04883 345/173 |
| 2010/0103117 A1 | 4/2010 | Townsend et al. | |
| 2010/0149114 A1* | 6/2010 | Li | G06F 3/0416 345/173 |
| 2011/0035700 A1* | 2/2011 | Meaney | G06F 3/048 715/784 |
| 2011/0304584 A1 | 12/2011 | Hwang | |
| 2012/0113008 A1 | 5/2012 | Makinen et al. | |
| 2012/0127107 A1 | 5/2012 | Miyashita et al. | |
| 2012/0162103 A1* | 6/2012 | Kobayashi | G06F 3/04815 345/173 |
| 2012/0169776 A1 | 7/2012 | Rissa et al. | |
| 2014/0055374 A1 | 2/2014 | Bart et al. | |

FOREIGN PATENT DOCUMENTS

| | | |
|---|---|---|
| JP | 2000-163031 A | 6/2000 |
| JP | 2002-342033 A | 11/2002 |
| WO | 2013/169849 A2 | 11/2013 |
| WO | 2014/035765 A2 | 3/2014 |
| WO | 2014/105276 A1 | 7/2014 |

OTHER PUBLICATIONS

Final Office Action received for U.S. Appl. No. 13/595,943 dated Oct. 5, 2017, 17 pages.
International Search Report received for PCT Patent Application No. PCT/US2013/056006 dated Apr. 9, 2014, 4 pages.
Lee, et al., "A Multi-Touch Three Dimensional Touch-Sensitive Tablet", CHI'85 Proceedings, Apr. 1985, pp. 21-25.
Non-Final Office Action received for U.S. Appl. No. 13/595,943 dated Aug. 5, 2014, 18 pages.
Non-Final Office Action received for U.S. Appl. No. 13/595,943 dated Jan. 9, 2017, 23 pages.
Non-Final Office Action received for U.S. Appl. No. 13/595,943 dated Mar. 11, 2016, 22 pages.
Notice of Allowance received for U.S. Appl. No. 13/595,943 dated Oct. 15, 2018, 6 pages.
Rubine, Dean H., "Combining Gestures and Direct Manipulation", CHI'92, May 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Youtube, "Sony Ericsson "One Finger" Zoom Tutorial for Android", Available at http://www.youtube.com/watch?v=Erj67oRHeeE, Aug. 22, 2012, 2 pages.

* cited by examiner

SINGLE CONTACT SCALING GESTURE

CROSS-REFERENCE TO RELATED APPLICATIONS

This application is a continuation of U.S. patent application Ser. No. 13/595,943, filed Aug. 27, 2012 and published on Feb. 27, 2014 as U.S. Patent Publication No. 2014-0055374, the contents of which are incorporated herein by reference in their entirety for all purposes.

FIELD OF THE DISCLOSURE

This relates generally to scaling gestures of a touch-sensitive surface.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device.

Example touch screen input can include a scaling gesture, wherein a user touches a touch-sensitive surface with two fingers and pinches the fingers together or apart to scale an image on a screen. For example, a scaling gesture can be used to zoom in and out of a map in a mapping application. However, a user may be unable to perform a two finger gesture when attempting to hold and operate a device with only one hand.

SUMMARY OF THE DISCLOSURE

This relates to providing input to a computing device based on a single contact scaling gesture. A scaling gesture can be performed on a touch-sensitive panel to zoom in or out of a displayed image, for example. One example of a scaling gesture can include two touch contacts moving towards or away from each other. A single contact scaling gesture can include selecting a scaling command based on a first touch input being held for a predetermined duration of time, or based on other criteria. Once the scaling command has been selected, subsequent touch input can determine both a scaling factor and a scaling direction of the scaling command.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various examples relate to providing input to a computing device based on a single contact scaling gesture. A scaling gesture can be performed on a touch-sensitive panel to zoom in or out of a displayed image, for example. One example of a scaling gesture can include two touch contacts moving towards or away from each other. A single contact scaling gesture can include selecting a scaling command based on a first touch input being held for a predetermined duration of time, or based on other criteria. Once the scaling command has been selected, subsequent touch input can determine both a scaling factor and a scaling direction of the scaling command.

Although examples disclosed herein may be described and illustrated herein primarily in terms of scaling gestures, it should be understood that examples are not so limited, but are additionally applicable to performing single contact gestures that mimic the behavior of multi-contact gestures in general. For example, the examples are also applicable to rotation gestures. Information of a single contact can be used to select a rotation gesture, and the movement of the single contact from a first position to a second position can be used to execute a rotation command, according to some examples. A gesture may be characterized by, but is not limited to a pinching, sliding, swiping, rotating, flexing, dragging, or tapping motion between or with any other finger or fingers, and each can be simulated with a single contact according to examples of the disclosure.

Although examples disclosed herein may be described and illustrated herein primarily in terms of a touch screen, it should be understood that the examples are not so limited, but are additionally applicable to touch I/O devices in general.

Figure 1:
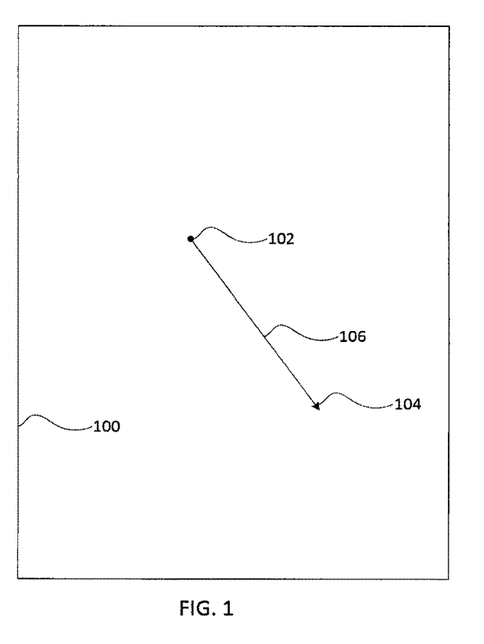
FIG. 1 illustrates an exemplary single contact scaling gesture according to examples of the disclosure.

FIG. 1 illustrates an exemplary single contact scaling gesture according to examples of the disclosure. A touch screen 100 can detect a first touch input at a first position 102 and, subsequently, a second touch input at a second position 104. An arrow 106 illustrates a distance and direction between the first position 102 and the second position 104. In some examples, the arrow 106 can also illustrate the motion of a single contact responsible for both the first and second touch input. In some examples, motion of a first contact may be tracked from the first position to the second position, the tracking of the motion being based on the detection of the first touch input and the second touch input.

A scaling command can be selected based on the detection of the first touch input. In some examples, the scaling command can be selected based on information of the first touch input. Information of the first touch input can include duration, motion, position, velocity, and acceleration, among other possibilities. For example, a duration of the first touch input can be compared to a predetermined temporal threshold. If the duration of the first touch input exceeds the predetermined temporal threshold, then a scaling command can be selected. For example, if the duration of the first touch input exceeds 0.5 seconds, then a scaling command can be selected. Other temporal thresholds may be used, such as 0.1 second, or 1.5 seconds, among other possibilities. If the detection of the first touch input includes detection of a liftoff and the duration of the first touch input does not exceed the predetermined temporal threshold, then alternate input may be selected instead of a scaling command. For example, the first touch input may instead be interpreted as a simple tap input, and a corresponding tap command may be selected. If the detection of the first touch input includes detection of a liftoff and the duration of the first touch input exceeds the predetermined temporal threshold, then a subsequent touch input can be interpreted as the second touch input as described above.

In some examples, the first touch input can be further tested for motion. For example, a scaling command may only be selected if the first touch input stays within a distance threshold of the first position, during a duration that exceeds the predetermined temporal threshold. If the first touch input does not stay within the distance threshold of the first position, then alternate input may be selected instead of a scaling command. For example, the first touch input may instead be interpreted as a drag gesture, and a corresponding drag command may be selected. Other criteria for selecting a scaling command can also be utilized in addition to, or as an alternative to, one or more of the preceding criteria, including, but not limited to, the location of the first touch input, or the application executing on the computing device at the time the first touch input is detected. In some examples, a user can place the computing device into a state for detecting the first touch input as a scaling command.

In some examples, the selection of the scaling command can be based only on the first touch input to the exclusion of other touch inputs. For example, in a single contact scaling gesture, the selection of the scaling command can be based only on information of a first touch input corresponding to a single contact, even if touch input of additional contacts is also detected.

A scaling factor and a scaling direction of the scaling command can be determined based on the distance and direction between the first position 102 of the first touch input and the second position 104 of the second touch input. Additionally, a scaling center of the scaling command can be determined based on the first position 104 of the first touch input. Other criteria for selecting a scaling factor can also be utilized in addition to, or as an alternative to, one or more of the preceding criteria, including, but not limited to, a velocity or acceleration of the motion between the first and second touch inputs.

During the executing of a scaling command, a displayed image can be scaled to be either larger or smaller, and portions of the displayed image can move relative to the display as the image is scaled. A scaling center can be determined based on the first position 102 of the first touch input, and during execution of a scaling command the portion of the displayed image at the scaling center can remain fixed relative to the display.

A scaling direction of a scaling command can be either positive or negative. For example, executing a scaling command with a positive scaling direction can cause an image on a display to zoom in, whereas executing a scaling command with a negative scaling direction can cause an image on a display to zoom out.

Figure 3A:
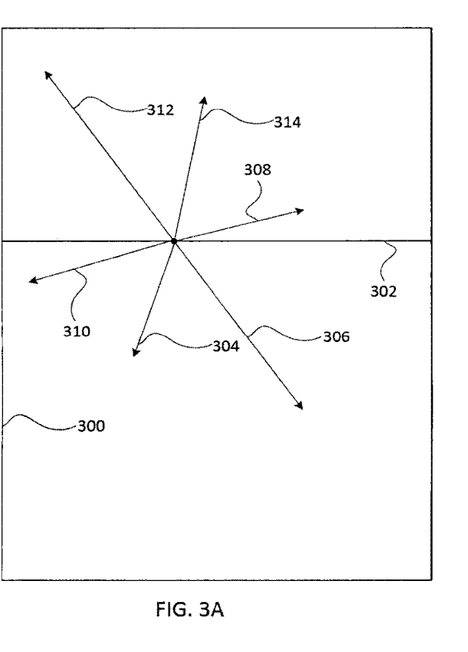
FIG. 3A illustrates a horizontal line representing a first criterion of determining a scaling direction according to examples of the disclosure.

A scaling direction can be determined based on the direction between the first position 102 and the second position 104. If the direction meets a first criterion, then the scaling direction can be determined to be positive. If the direction does not meet the first criterion, then the scaling direction can be determined to be negative. In some examples, the first criterion may be whether a y-component of the direction is positive. For example, if a y-component of the direction is positive, then the scaling direction can be determined to be positive. In some examples, the determination of the first criterion can include subtracting a y-value of the first position from a y-value of the second position, and determining whether the difference is positive or negative. FIG. 3A illustrates a horizontal line 302 representing the first criterion according to some examples. Directions, 310, 304, and 306 each point below the horizontal line 302 (having a positive y-component), and can thus be determined to satisfy the first criterion, whereas directions 312, 314, and 308 each point above the diagonal line 302 (having a negative y-component) and can thus be determined to fail the first criterion. Accordingly, the scaling direction can be determined to be positive for each of directions 310, 304, and 306, and the scaling direction can be determined to be negative for each of directions 312, 314, and 308. In some examples, a positive y-component can correspond to a negative scaling direction and a negative y-component can correspond to a positive scaling direction.

Figure 3B:
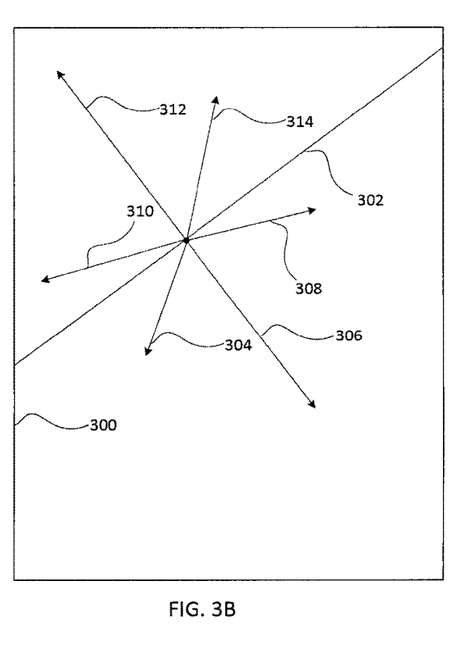
FIG. 3B illustrates a diagonal line representing a first criterion of determining a scaling direction according to examples of the disclosure.

In some examples, the first criterion may be determined based on both x- and y-components of the direction between the first position and the second position. FIG. 3B illustrates a diagonal line 302 representing the first criterion according to some examples. Directions 304, 306, and 308 each point below the diagonal line 302 and can thus be determined to satisfy the first criterion, whereas directions 310, 312, and 314 each point above the diagonal line 302 and can thus be determined to fail the first criterion. Accordingly, the scaling direction can be determined to be positive for each of directions 304, 306, and 308, and the scaling direction can be determined to be negative for each of directions 310, 312, and 314.

Referring to FIG. 1, a scaling factor can be determined based on the distance between the first position 102 and the second position 104. The scaling factor may be proportional to the distance, and it may be calculated as a scalar multiple of the distance. In some examples, the scalar multiple may be a normalization factor based on a touch resolution and/or other properties of the touch screen 100. The scaling factor can determine how much to scale an image on a display during execution of a scaling command. For example, executing a scaling command with a scaling factor of 2 can cause an image on a display to become twice as large or twice as small, depending on the scaling direction.

Figure 2:
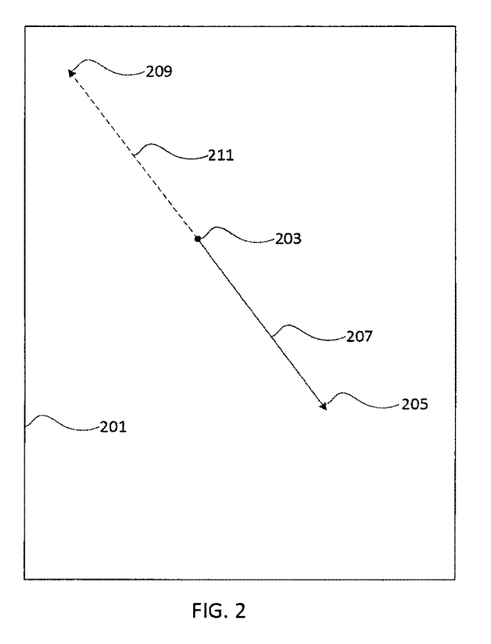
FIG. 2 illustrates executing a scaling command that operates as if a virtual contact made equal and reciprocal motion to the motion of a contact responsible for first and second touch input according to examples of the disclosure.

If a scaling direction is positive (e.g., zoom in), the scaling command can be executed as if a virtual contact made equal and reciprocal motion to the motion of a contact responsible for the first and second touch input, as illustrated in FIG. 2. In a conventional two contact scaling gesture in a positive scaling direction, if a first contact touches down at the first position 203 and then moves to the second position 205, and a second contact touches down near the first position 203 and then moves to a third position 209, then a scaling factor can be determined based on a distance between the third position 209 and the second position 205. In some examples, the scaling factor may be proportional to the distance between the third position 209 and the second position 205. Because the motion 211 can be equal and reciprocal to the motion 207, the distance between the first position 203 and the second position 205 can be half the distance between the third position 209 and the second position 205. Accordingly, a scaling factor that is proportional to the distance between the third position 209 and the second position 205 would also be proportional to the distance between the first position 203 and the second position 205.

Figure 4:
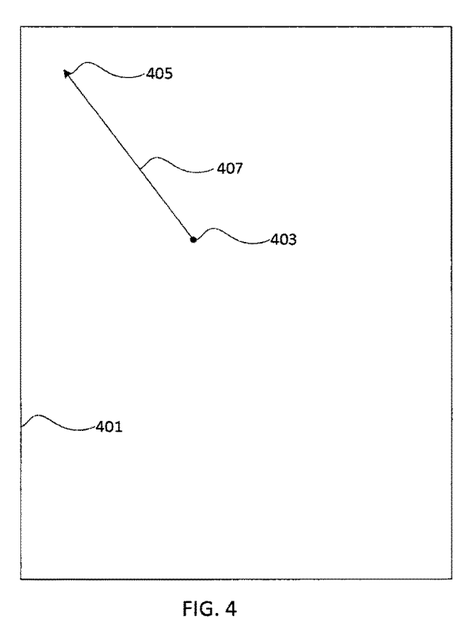
FIG. 4 illustrates an exemplary single contact scaling gesture in a negative scaling direction (e.g., zoom out), according to examples of the disclosure.
Figure 5:
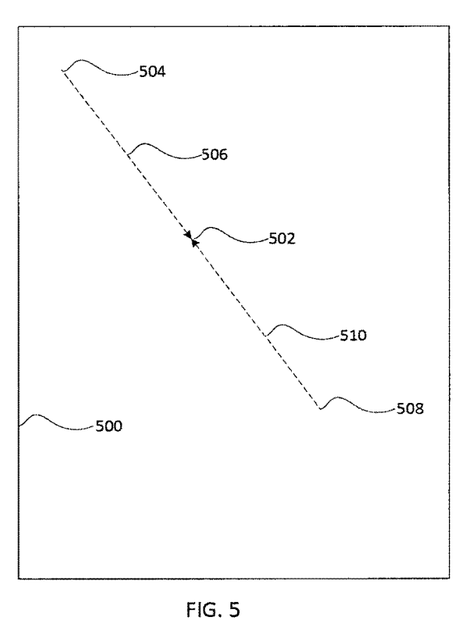
FIG. 5 illustrates executing a scaling command that operates as if a first virtual contact moved from a second position to a first position and a second virtual contact made equal and reciprocal motion to the motion of the first virtual contact according to examples of the disclosure.

FIG. 4 illustrates an exemplary single contact scaling gesture in a negative scaling direction (e.g., zoom out) moving from a first position 403 to a second position 405, according to examples of the disclosure. A scaling command based on such a scaling gesture can be executed as illustrated in FIG. 5, as if a first virtual contact instead moved from a second position 504 to a first position 502 and a second virtual contact made equal and reciprocal motion 510 to the motion 506 of the first virtual contact. In a conventional two contact scaling gesture in a negative scaling direction, if a first contact touches down at the second position 504 and moves to the first position 502, and a second contact touches down at the third position 508 and then moves to the first position 502, then a scaling factor can be determined based on a distance between the third position 508 and the second position 504. Similar to the above discussion regarding gestures in a positive scaling direction, a scaling factor that is proportional to the distance between the third position 508 and the second position 504 would also be proportional to the distance between the first position 502 and the second position 504.

In some examples, a virtual contact can be displayed during a single contact scaling gesture. The display of a virtual contact can give a user an intuitive feel for how the single contact scaling gesture relates to a more conventional two contact scaling gesture. In some examples, the virtual contact can be displayed making equal and reciprocal motion to the single contact. In some examples, a reflection position of the single contact can be determined across the scaling center. Then, a user interface object corresponding to the reflection position can be displayed. For example, referring to FIG. 2, a reflection position of the second position 205 across the first position 203 can be determined. The reflection position can be determined as the third position 209. Then, a user interface object, such as a circle or an ellipse, among other possibilities, can be displayed at the third position 209.

Figure 6:
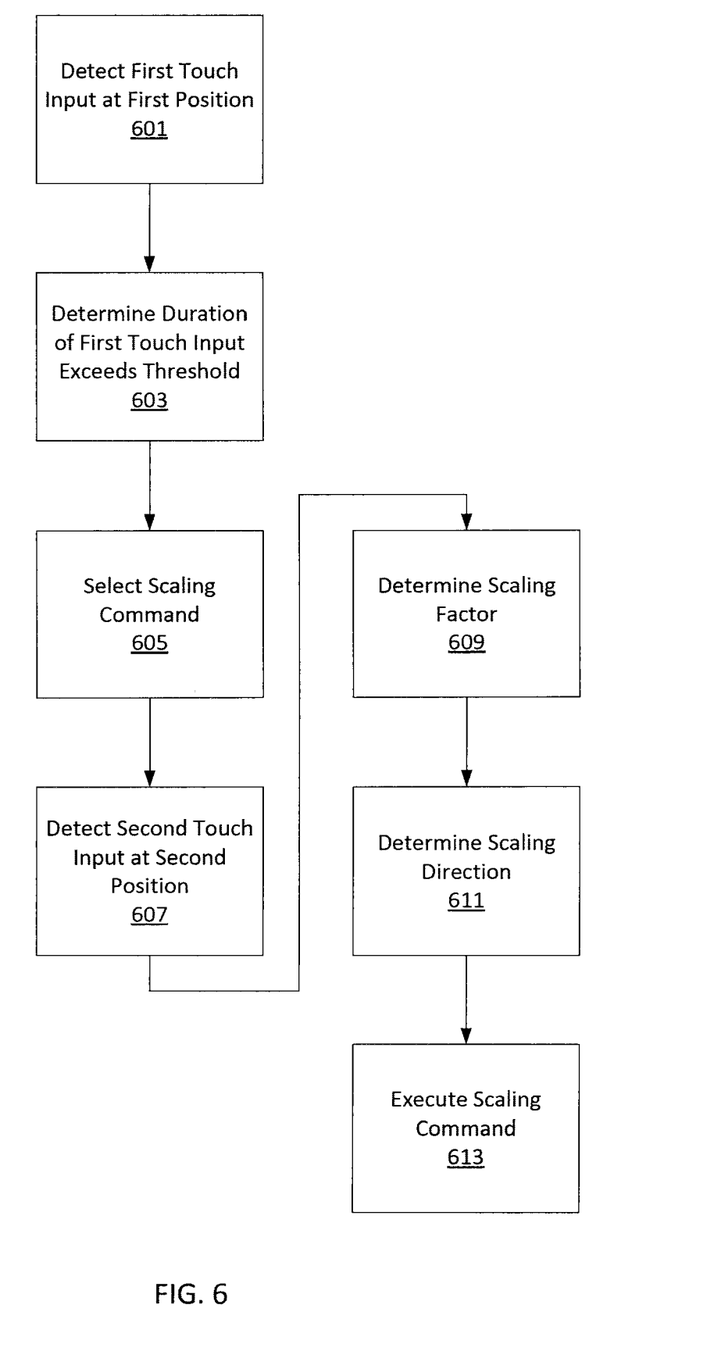
FIG. 6 illustrates an exemplary single contact scaling gesture method according to examples of the disclosure.

FIG. 6 illustrates an exemplary single contact scaling gesture method according to examples of the disclosure. First, a first touch input by a user can be detected at a first position on a touch-sensitive panel (step 601). It can be determined that a duration of the first touch input (or some other value) exceeds a predetermined threshold (step 603). Based on the determination that the duration (or other value) exceeds the predetermined threshold, a scaling command can be selected (step 605). In some examples, a scaling command can be selected based on other information of a first touch input, as discussed above. A second touch input by the user can be detected at a second position on the touch-sensitive panel (step 607). A scaling factor can be determined based on a distance between the first position and the second position (or some other criteria) (step 609). A scaling direction can be determined based on a direction from the first position to the second position (step 611). The scaling command can be executed based on the scaling factor and the scaling direction (step 613).

In some examples, a scaling center can be a predetermined position, such as a centroid of the touch-sensitive panel, among other possibilities. Additionally, a scaling direction can be determined based on whether a direction from a first position of a first touch input to a second position of a second touch input is toward the scaling center or away from the scaling center. For example, if the direction from the first position to the second position is toward the scaling center, then the scaling direction can be determined to be negative. If the direction from the first position to the second position is away from the scaling center, then the scaling direction can be determined to be positive. This example of a first criterion can be visualized, in contrast to FIGS. 3A and 3B, as a circle through the first position and around the scaling center as the center of the circle. Any direction pointing inside the circle can fail the first criterion, and the scaling direction can be determined to be negative. Any direction pointing outside the circle can pass the first criterion, and the scaling direction can be determined to be positive. In some examples, the scaling factor can be based on a component of the displacement from the first position to the second position, the component being parallel to a line from the first position to the scaling center.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
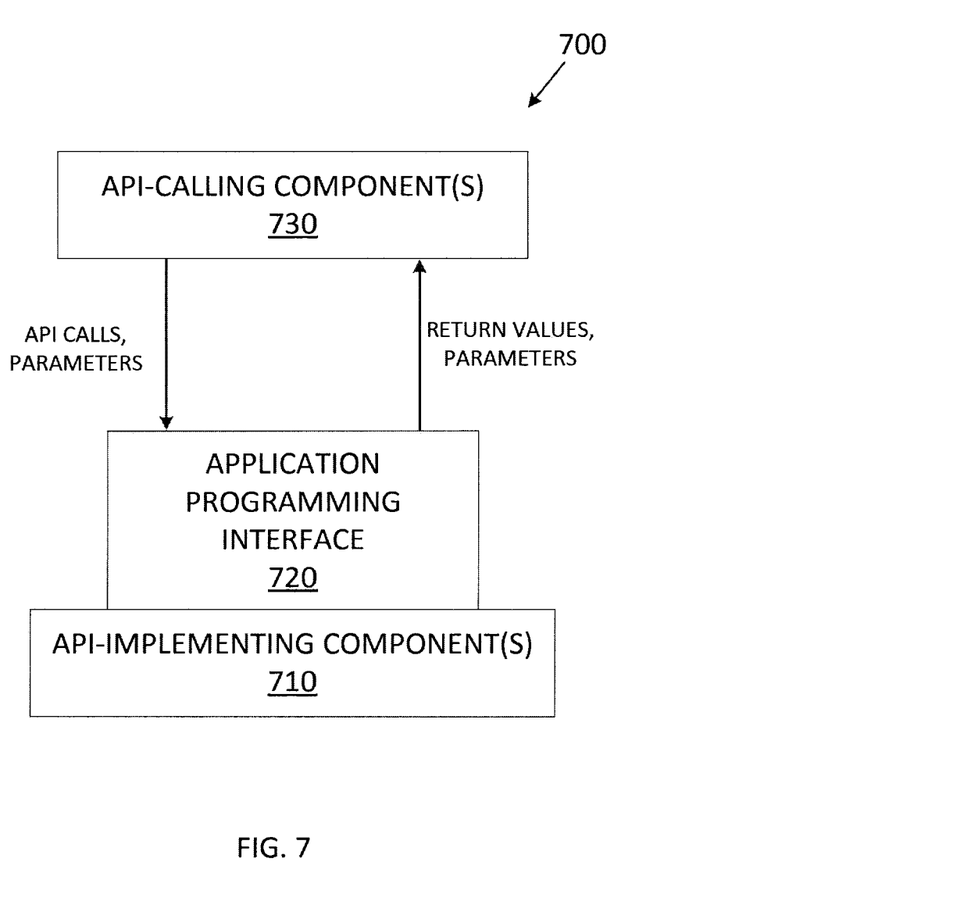
FIG. 7 is a block diagram illustrating an exemplary API architecture, which may be used in some examples of the disclosure.

FIG. 7 is a block diagram illustrating an exemplary API architecture, which may be used in some examples of the disclosure. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8:
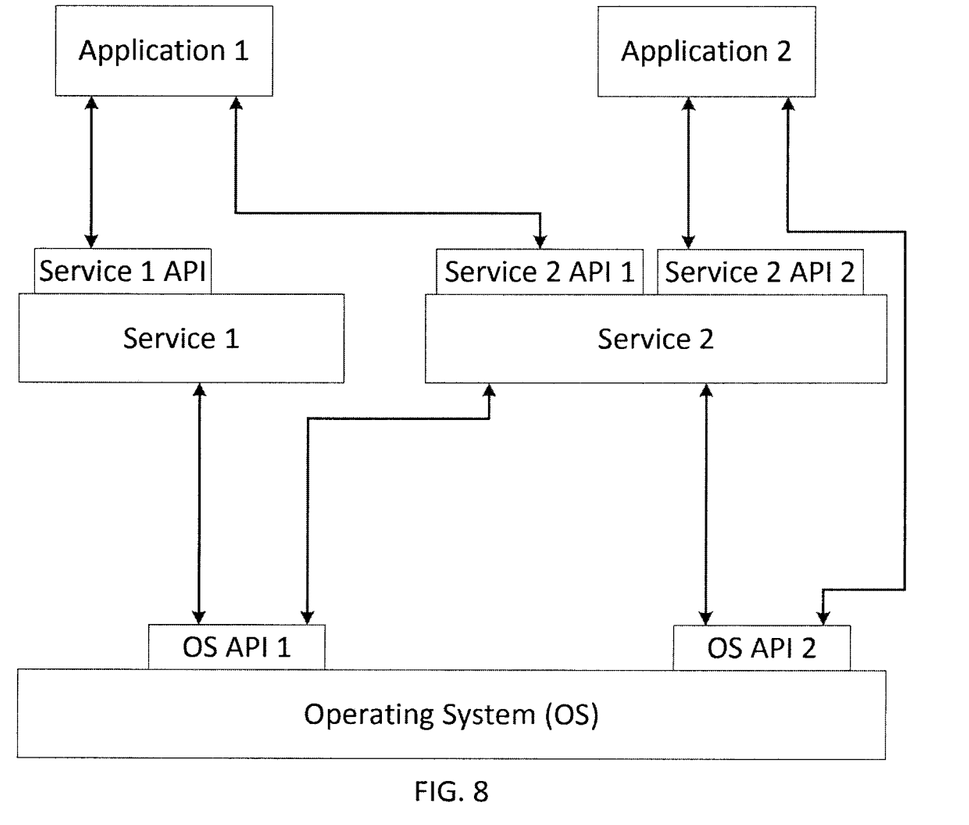
FIG. 8 illustrates an exemplary software stack of an API according to examples of the disclosure.

In the exemplary software stack shown in FIG. 8, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 9:
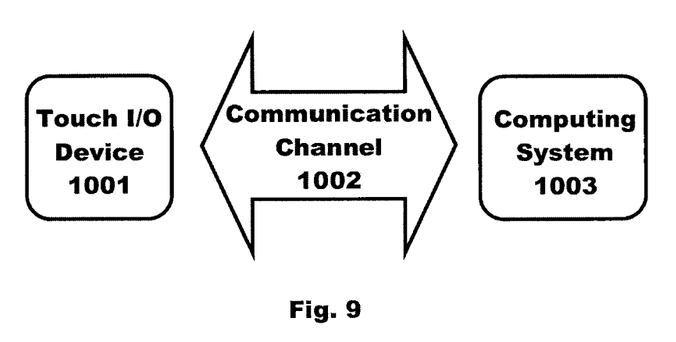
FIG. 9 is a block diagram illustrating exemplary interactions between the touch screen and the other components of the device according to examples of the disclosure.

FIG. 9 is a block diagram illustrating exemplary interactions between the touch screen and the other components of the device. In FIG. 9, the touch screen illustrated in FIGS. 1-5 and can be the touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensitive components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof. Exemplary gestures include the single contact and two contact scaling gestures discussed above in view of FIGS. 1-6.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 10:
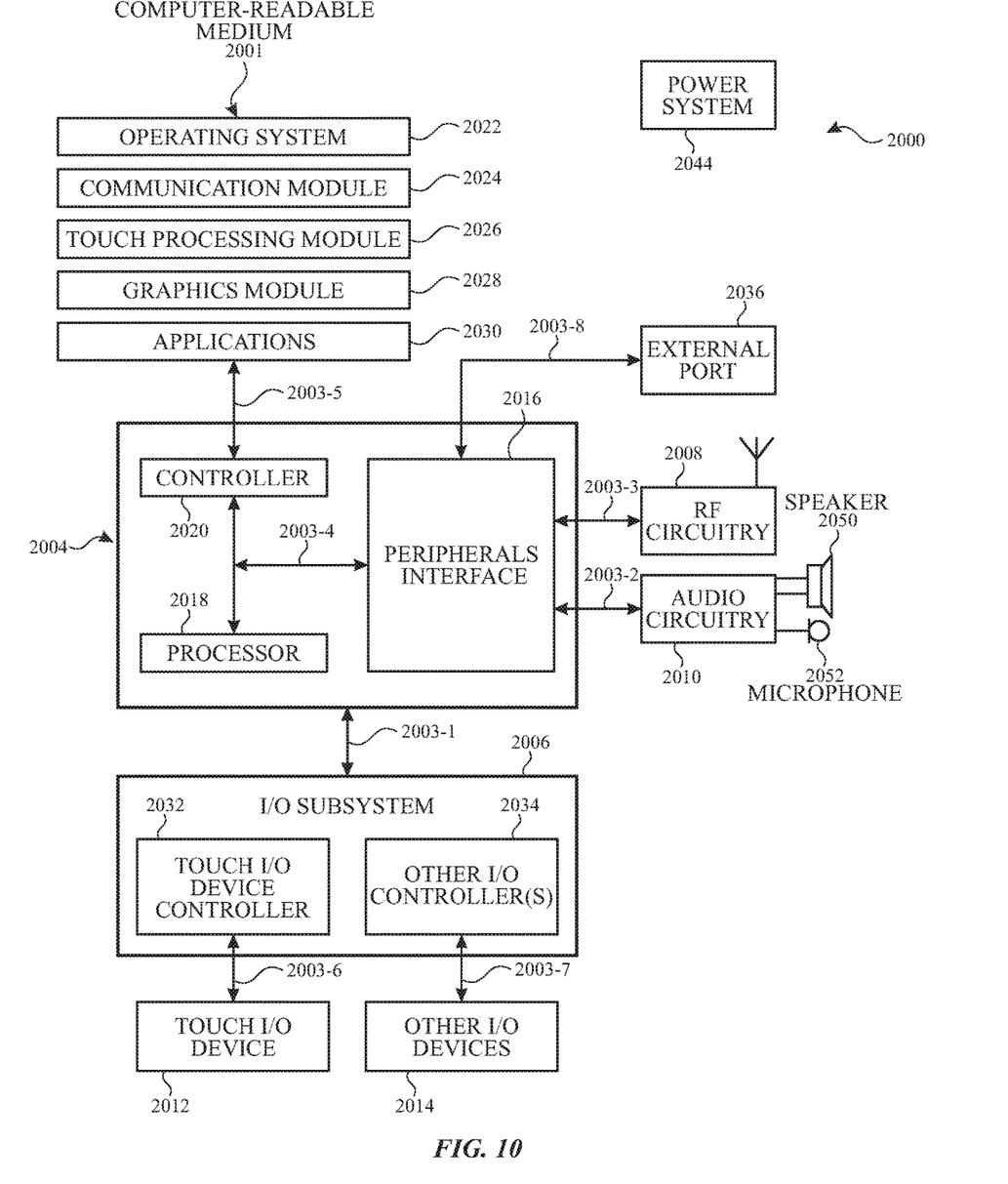
FIG. 10 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 10 is a block diagram of one example of system 2000 that generally includes one or more computer-readable mediums 2001, processing system 2004, I/O subsystem 2006, radio frequency (RF) circuitry 2008 and audio circuitry 2010. These components may be coupled by one or more communication buses or signal lines 2003.

It should be apparent that the architecture shown in FIG. 10 is only one example architecture of system 2000, and that system 2000 could have more or fewer components than shown, or a different configuration of components. The various components shown in FIG. 10 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in allowing users to perform scaling operations while holding and operating a device with only one hand, and have at least the technical effect of creating a second, virtual touch input based on only a single actual touch input.

In some examples, a computer-implemented method of a touch-sensitive panel is disclosed. The method includes detecting a first touch input on the touch-sensitive panel, the first touch input being at a first position on the touch-sensitive panel; based on information of the first touch input, selecting a scaling command; detecting a second touch input on the touch-sensitive panel, the second touch input being at a second position on the touch-sensitive panel; determining a scaling factor based on a distance between the first position and the second position; determining a scaling direction based on a direction from the first position to the second position; and executing the scaling command based on the scaling factor and the scaling direction. Additionally or alternatively to one or more of the examples disclosed above, the method can further include: determining a reflection position of the second position across the first position; and displaying a user interface object corresponding to the reflection position. Additionally or alternatively to one or more of the examples disclosed above, the method can further include: determining that the first touch input remains within a predetermined threshold distance of the first position, wherein selecting the scaling command based on information of the first touch input can include selecting the scaling command based on the determination that the first touch input remains with the predetermined threshold distance. Additionally or alternatively to one or more of the examples disclosed above, the method can further include: determining that a duration of the first touch input exceeds a predetermined temporal threshold, wherein selecting the scaling command based on information of the first touch input can include selecting the scaling command based on the determination that the duration of the first touch input exceeds the predetermined temporal threshold. Additionally or alternatively to one or more of the examples disclosed above, the method can further include: tracking a motion of a first contact from the first position to the second position, wherein the tracking can be based on the detection of the first touch input at the first position and the second touch input at the second position. Additionally or alternatively to one or more of the examples disclosed above, the method can further include: displaying a virtual contact making equal and reciprocal motion to the motion of the first contact, mirrored across the first position. Additionally or alternatively to one or more of the examples disclosed above, the method can further include: determining a scaling center based on the first position, wherein executing the scaling command can be further based on the scaling center. Additionally or alternatively to one or more of the examples disclosed above, executing the scaling command based on the scaling center can include displaying a scaled image with a portion of the image fixed at the scaling center. Additionally or alternatively to one or more of the examples disclosed above, determining the scaling direction can include determining one of a positive scaling direction and a negative scaling direction. Additionally or alternatively to one or more of the examples disclosed above, executing the scaling command based on the scaling direction can include one of displaying an image scaled to be larger based on a positive scaling direction and displaying an image scaled to be smaller based on a negative scaling direction. Additionally or alternatively to one or more of the examples disclosed above, determining the scaling direction based on the direction from the first position to the second position can include determining whether a component of the direction from the first position to the second position is positive or negative with respect to an axis of the touch-sensitive panel. Additionally or alternatively to one or more of the examples disclosed above, determining the scaling factor based on the distance between the first position and the second position can include determining a scalar multiple of the distance between the first position and the second position. Additionally or alternatively to one or more of the examples disclosed above, the information of the first touch input can include one or more of duration, motion, position, velocity, and acceleration of the first touch input.

In some examples, an electronic device is provided. The electronic device can include a touch-sensitive panel for receiving touch input; a processor to execute instructions; and a memory coupled with the processor to store instructions, which when executed by the processor, cause the processor to perform operations to generate an application programming interface (API) that allows an API-calling component to perform the following operations: detecting a first touch input on the touch-sensitive panel, the first touch input being at a first position on the touch-sensitive panel; based on information of the first touch input, selecting a scaling command; detecting a second touch input on the touch-sensitive panel, the second touch input being at a second position on the touch-sensitive panel; determining a scaling factor based on a distance between the first position and the second position; determining a scaling direction based on a direction from the first position to the second position; and executing the scaling command based on the scaling factor and the scaling direction. Additionally or alternatively to one or more of the examples disclosed above, the operations can further include: determining a reflection position of the second position across the first position; and displaying a user interface object corresponding to the reflection position. Additionally or alternatively to one or more of the examples disclosed above, the operations can further include: determining that the first touch input remains within a predetermined threshold distance of the first position, wherein selecting the scaling command based on information of the first touch input can include selecting the scaling command based on the determination that the first touch input remains with the predetermined threshold distance. Additionally or alternatively to one or more of the examples disclosed above, the operations can further include: determining that a duration of the first touch input exceeds a predetermined temporal threshold, wherein selecting the scaling command based on information of the first touch input can include selecting the scaling command based on the determination that the duration of the first touch input exceeds the predetermined temporal threshold. Additionally or alternatively to one or more of the examples disclosed above, the operations can further include: tracking a motion of a first contact from the first position to the second position, wherein the tracking can be based on the detection of the first touch input at the first position and the second touch input at the second position. Additionally or alternatively to one or more of the examples disclosed above, the operations can further include: displaying a virtual contact making equal and reciprocal motion to the motion of the first contact, mirrored across the first position. Additionally or alternatively to one or more of the examples disclosed above, the operations can further include: determining a scaling center based on the first position, wherein executing the scaling command can be further based on the scaling center. Additionally or alternatively to one or more of the examples disclosed above, executing the scaling command based on the scaling center can include displaying a scaled image with a portion of the image fixed at the scaling center. Additionally or alternatively to one or more of the examples disclosed above, determining the scaling direction can include determining one of a positive scaling direction and a negative scaling direction. Additionally or alternatively to one or more of the examples disclosed above, executing the scaling command based on the scaling direction can include one of displaying an image scaled to be larger based on a positive scaling direction and displaying an image scaled to be smaller based on a negative scaling direction. Additionally or alternatively to one or more of the examples disclosed above, determining the scaling direction based on the direction from the first position to the second position can include determining whether a component of the direction from the first position to the second position is positive or negative with respect to an axis of the touch-sensitive panel. Additionally or alternatively to one or more of the examples disclosed above, determining the scaling factor based on the distance between the first position and the second position can include determining a scalar multiple of the distance between the first position and the second position. Additionally or alternatively to one or more of the examples disclosed above, the information of the first touch input can include one or more of duration, motion, position, velocity, and acceleration of the first touch input.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method comprising:
   at an electronic device with a touch-sensitive display:
   displaying, on the touch-sensitive display, a user interface that includes a user interface object;
   while displaying the user interface that includes the user interface object, detecting, on the touch-sensitive display, a sequence of one or more inputs including touchdown of a first contact on the touch-sensitive display; and
   in response to detecting the sequence of one or more inputs:
   in accordance with a determination that a movement of the first contact within a first time threshold of the touchdown of the first contact is greater than a movement threshold, performing a drag operation in the user interface in accordance with the movement of the first contact; and
   in accordance with a determination that the sequence of one or more inputs includes liftoff of the first contact, without detecting movement of the first contact more than the movement threshold, and that the liftoff of the first contact is followed by touchdown of a second contact, performing a scaling operation that includes scaling the user interface object in the user interface in accordance with a movement of the second contact on the touch-sensitive display, wherein:
   the scaling operation is associated with a scaling center that is not based on a location of the touchdown of the first contact, and
   a portion of the user interface object at the scaling center remains fixed relative to the touch-sensitive display during the scaling of the user interface object.

2. The method of claim 1, wherein the scaling operation is associated with a reference point associated with a scaling direction or a scaling factor of the scaling operation.

3. The method of claim 2, wherein the scaling direction of the scaling operation is based on a location of the reference point.

4. The method of claim 2, wherein performing the scaling operation comprises:
   in accordance with a determination that a y-component of a position of the second contact with respect to the location of the reference point is positive, performing the scaling operation with a first scaling direction; and
   in accordance with a determination that the y-component of the position of the second contact with respect to the location of the reference point is negative, performing the scaling operation with a second scaling direction, different than the first scaling direction.

5. The method of claim 4, wherein the scaling operation is performed with the first scaling direction independent of a x-component of the position of the second contact with respect to the location of the reference point, and the scaling operation is performed with the second scaling direction independent of the x-component of the position of the second contact with respect to the location of the reference point.

6. The method of claim 2, wherein performing the scaling operation comprises:
in accordance with a determination that a first component of a position of the second contact with respect to the location of the reference point has a first magnitude, performing the scaling operation with a first scaling factor; and
in accordance with a determination that the first component of the position of the second contact with respect to the location of the reference point has a second magnitude, performing the scaling operation with a second scaling factor, different than the first scaling factor.

7. The method of claim 1, wherein a location of the scaling center is at a predetermined position on the touch-sensitive display.

8. The method of claim 7, wherein the predetermined position is a centroid of the touch-sensitive display.

9. The method of claim 1, further comprising:
in response to detecting the sequence of one or more inputs:
in accordance with a determination that the sequence of one or more inputs includes the liftoff of the first contact after detecting movement of the first contact more than the movement threshold, and that the liftoff of the first contact is followed by the touchdown of the second contact, forgoing performance of the scaling operation in the user interface in accordance with the movement of the second contact on the touch-sensitive display.

10. The method of claim 1, wherein the user interface object is an image displayed via the touch-sensitive display.

11. A non-transitory computer readable storage medium including instructions, which when executed by a processor of an electronic device with a touch-sensitive display, cause the electronic device to perform a method comprising:
displaying, on the touch-sensitive display, a user interface that includes a user interface object;
while displaying the user interface that includes the user interface object, detecting, on the touch-sensitive display, a sequence of one or more inputs including touchdown of a first contact on the touch-sensitive display; and
in response to detecting the sequence of one or more inputs:
in accordance with a determination that a movement of the first contact within a first time threshold of the touchdown of the first contact is greater than a movement threshold, performing a drag operation in the user interface in accordance with the movement of the first contact; and
in accordance with a determination that the sequence of one or more inputs includes liftoff of the first contact, without detecting movement of the first contact more than the movement threshold, and that the liftoff of the first contact is followed by touchdown of a second contact, performing a scaling operation that includes scaling the user interface object in the user interface in accordance with a movement of the second contact on the touch-sensitive display, wherein:
the scaling operation is associated with a scaling center that is not based on a location of the touchdown of the first contact, and
a portion of the user interface object at the scaling center remains fixed relative to the touch-sensitive display during the scaling of the user interface object.

12. The non-transitory computer readable storage medium of claim 11, wherein the scaling operation is associated with a reference point associated with a scaling direction or a scaling factor of the scaling operation.

13. The non-transitory computer readable storage medium of claim 12, wherein the scaling direction of the scaling operation is based on a location of the reference point.

14. The non-transitory computer readable storage medium of claim 12, wherein performing the scaling operation comprises:
in accordance with a determination that a y-component of a position of the second contact with respect to the location of the reference point is positive, performing the scaling operation with a first scaling direction; and
in accordance with a determination that the y-component of the position of the second contact with respect to the location of the reference point is negative, performing the scaling operation with a second scaling direction, different than the first scaling direction.

15. The non-transitory computer readable storage medium of claim 14, wherein the scaling operation is performed with the first scaling direction independent of a x-component of the position of the second contact with respect to the location of the reference point, and the scaling operation is performed with the second scaling direction independent of the x-component of the position of the second contact with respect to the location of the reference point.

16. The non-transitory computer readable storage medium of claim 12, wherein performing the scaling operation comprises:
in accordance with a determination that a first component of a position of the second contact with respect to the location of the reference point has a first magnitude, performing the scaling operation with a first scaling factor; and
in accordance with a determination that the first component of the position of the second contact with respect to the location of the reference point has a second magnitude, performing the scaling operation with a second scaling factor, different than the first scaling factor.

17. The non-transitory computer readable storage medium of claim 11, wherein a location of the scaling center is at a predetermined position on the touch-sensitive display.

18. The non-transitory computer readable storage medium of claim 17, wherein the predetermined position is a centroid of the touch-sensitive display.

19. The non-transitory computer readable storage medium of claim 11, the method further comprising:
in response to detecting the sequence of one or more inputs:
in accordance with a determination that the sequence of one or more inputs includes the liftoff of the first contact after detecting movement of the first contact more than the movement threshold, and that the liftoff of the first contact is followed by the touchdown of the second contact, forgoing performance of the scaling operation in the user interface in accordance with the movement of the second contact on the touch-sensitive display.

20. The non-transitory computer readable storage medium of claim 11, wherein the user interface object is an image displayed via the touch-sensitive display.

21. An electronic device comprising:
one or more processors;
a touch-sensitive display; and
memory storing instructions, which when executed by the one or more processors cause the electronic device to perform a method comprising:
  displaying, on the touch-sensitive display, a user interface that includes a user interface object;
  while displaying the user interface that includes the user interface object, detecting, on the touch-sensitive display, a sequence of one or more inputs including touchdown of a first contact on the touch-sensitive display; and
  in response to detecting the sequence of one or more inputs:
    in accordance with a determination that a movement of the first contact within a first time threshold of the touchdown of the first contact is greater than a movement threshold, performing a drag operation in the user interface in accordance with the movement of the first contact;
    in accordance with a determination that the sequence of one or more inputs includes liftoff of the first contact, without detecting movement of the first contact more than the movement threshold, and that the liftoff of the first contact is followed by touchdown of a second contact, performing a scaling operation that includes scaling the user interface object in the user interface in accordance with a movement of the second contact on the touch-sensitive display, wherein:
      the scaling operation is associated with a scaling center that is not based on a location of the touchdown of the first contact, and
      a portion of the user interface object at the scaling center remains fixed relative to the touch-sensitive display during the scaling of the user interface object.

22. The electronic device of claim 21, wherein the scaling operation is associated with a reference point associated with a scaling direction or a scaling factor of the scaling operation.

23. The electronic device of claim 22, wherein the scaling direction of the scaling operation is based on the location of the reference point.

24. The electronic device of claim 22, wherein performing the scaling operation comprises:

in accordance with a determination that a y-component of a position of the second contact with respect to the location of the reference point is positive, performing the scaling operation with a first scaling direction; and
in accordance with a determination that the y-component of the position of the second contact with respect to the location of the reference point is negative, performing the scaling operation with a second scaling direction, different than the first scaling direction.

25. The electronic device of claim 24, wherein the scaling operation is performed with the first scaling direction independent of a x-component of the position of the second contact with respect to the location of the reference point, and the scaling operation is performed with the second scaling direction independent of the x-component of the position of the second contact with respect to the location of the reference point.

26. The electronic device of claim 22, wherein performing the scaling operation comprises:
  in accordance with a determination that a first component of a position of the second contact with respect to the location of the reference point has a first magnitude, performing the scaling operation with a first scaling factor; and
  in accordance with a determination that the first component of the position of the second contact with respect to the location of the reference point has a second magnitude, performing the scaling operation with a second scaling factor, different than the first scaling factor.

27. The electronic device of claim 21, wherein a location of the scaling center is at a predetermined position on the touch-sensitive display.

28. The electronic device of claim 27, wherein the predetermined position is a centroid of the touch-sensitive display.

29. The electronic device of claim 21, the method further comprising:
  in response to detecting the sequence of one or more inputs:
    in accordance with a determination that the sequence of one or more inputs includes the liftoff of the first contact after detecting movement of the first contact more than the movement threshold, and that the liftoff of the first contact is followed by the touchdown of the second contact, forgoing performance of the scaling operation in the user interface in accordance with the movement of the second contact on the touch-sensitive display.

30. The electronic device of claim 21, wherein the user interface object is an image displayed via the touch-sensitive display.

* * * * *